US012634016B2

(12) United States Patent
Horikoshi et al.

(10) Patent No.: US 12,634,016 B2
(45) Date of Patent: May 19, 2026

(54) ADAPTIVE EQUALIZER, STEP SIZE DERIVATION METHOD AND PROGRAM

(71) Applicant: NTT, Inc., Tokyo (JP)

(72) Inventors: Kengo Horikoshi, Musashino (JP);
Seiji Okamoto, Musashino (JP);
Masanori Nakamura, Musashino (JP)

(73) Assignee: NTT, Inc., Tokyo (JP)

( * ) Notice: Subject to any disclaimer, the term of this patent is extended or adjusted under 35 U.S.C. 154(b) by 405 days.

(21) Appl. No.: 18/039,125

(22) PCT Filed: Dec. 14, 2020

(86) PCT No.: PCT/JP2020/046535
§ 371 (c)(1),
(2) Date: May 26, 2023

(87) PCT Pub. No.: WO2022/130455
PCT Pub. Date: Jun. 23, 2022

(65) Prior Publication Data
US 2024/0007195 A1 Jan. 4, 2024

(51) Int. Cl.
*H04B 10/61* (2013.01)
*H04J 14/06* (2006.01)
(52) U.S. Cl.
CPC ..... *H04B 10/6162* (2013.01); *H04B 10/6166* (2013.01); *H04J 14/06* (2013.01)
(58) Field of Classification Search
None
See application file for complete search history.

(56) References Cited

U.S. PATENT DOCUMENTS

| | | | | |
|---|---|---|---|---|
| 8,471,570 B2 * | 6/2013 | Portmann | .......... | H03K 17/9622 |
| | | | | 345/173 |
| 9,722,768 B2 * | 8/2017 | Inoue | ................. | H04B 10/6164 |
| 10,608,743 B2 * | 3/2020 | Takamuku | ............. | H04B 10/61 |
| 11,283,528 B2 * | 3/2022 | Masuda | .................... | G02F 2/00 |
| 11,777,598 B2 * | 10/2023 | Amiri | ................. | G06N 3/0464 |
| | | | | 398/28 |
| 12,028,109 B2 * | 7/2024 | Takamuku | ............. | H03H 21/00 |
| 12,040,834 B2 * | 7/2024 | Takamuku | ......... | H04B 10/6162 |
| 2021/0218476 A1 | 7/2021 | Masuda et al. | | |

FOREIGN PATENT DOCUMENTS

JP          2020043492 A          3/2020

OTHER PUBLICATIONS

Seb J. Savory, "Digital filters for coherent optical receivers", Optics Express vol. 16, No. 2, pp. 804-817 (2008).

* cited by examiner

*Primary Examiner* — Jai M Lee
(74) *Attorney, Agent, or Firm* — Harness, Dickey & Pierce, P.L.C.

(57) ABSTRACT

An adaptive equalizer includes an updating unit that updates a step size of a vector of a tap coefficient used for controlling an adaptive filter based on a time-series update vector in accordance with a time-series input and output of the adaptive filter that tracks a polarization state of an optical signal received by a coherent optical receiver. The updating unit updates the step size based on a DC gain of the update vector. The updating unit may update the step size for each update vector component based on a DC gain for each update vector component.

5 Claims, 5 Drawing Sheets

ADAPTIVE EQUALIZER, STEP SIZE DERIVATION METHOD AND PROGRAM

CROSS-REFERENCE TO RELATED APPLICATIONS

This application is a 371 U.S. National Phase of International Application No. PCT/JP2020/046535, filed on Dec. 14, 2020. The entire disclosure of the above application is incorporated herein by reference.

TECHNICAL FIELD

The present invention relates to an adaptive equalizer, a step size derivation method and a program.

BACKGROUND ART

An optical signal has polarization states having two axes orthogonal to each other (x polarization and y polarization). In polarization multiplexing used in coherent optical data transmission, different information symbols are assigned to the polarization states having these two axes. The transmission capacity of the optical signal transmitted through the optical fiber is doubled by such polarization multiplexing.

The polarization state of the optical signal transmitted through the optical fiber is subjected to random and non-stationary fluctuation in accordance with the lapse of time. For example, in an optical fiber laid in an underground pipe, a fluctuation of about several Hz occurs in a polarization state of an optical signal. For example, in an optical fiber disposed as an overhead wire, a fluctuation of about several kHz occurs in a polarization state of an optical signal. In particular, in an optical-fiber composite overhead ground wire (OPGW), which is an overhead ground wire surrounding an optical fiber, a fluctuation in the order of MHz occurs instantaneously in the polarization state of an optical signal due to the influence of a lightning strike or the like.

Since it is necessary to compensate for the fluctuation of the polarization state in the coherent optical data transmission, the coherent optical receiver uses an adaptive filter to track the fluctuation of the polarization state (see NPD 1).

CITATION LIST

Non Patent Document

[NPD 1] Seb J. Savory, "Digital filters for coherent optical receivers," Optics Express Vol. 16, Issue 2, pp. 804-817 (2008).

SUMMARY OF INVENTION

Technical Problem

An optimization algorithm such as the least mean square algorithm (LMS algorithm) or the constant modulus algorithm (CMA) is used to control the adaptive filter.

In the LMS algorithm, the product of the amplitude vector "x" or "y" of a polarization component of the main signal input to the finite impulse response (FIR) filter and the error "e" is repeatedly added to the tap coefficient vector "h" as shown in Equation (1).

[Math. 1]

$$\begin{cases} h_{xx}(n+1) = h_{xx}(n) + \mu * e_x(n)x(n) \\ h_{xy}(n+1) = h_{xx}(n) + \mu * e_x(n)y(n) \\ h_{yx}(n+1) = h_{yx}(n) + \mu * e_y(n)x(n) \\ h_{yy}(n+1) = h_{yy}(n) + \mu * e_y(n)y(n) \end{cases} \quad (1)$$

Here, "μ" represents a step size. The step size is a positive real number sufficiently smaller than 1, and is a parameter for controlling the speed in response to the fluctuation of the polarization state. The larger the step size, the more the tracking performance the high-speed fluctuation of the polarization state is improved. The adaptive filter can follow a fluctuation in polarization state of an optical signal in an optical fiber as a transmission path using a vector of tap coefficients updated according to the step size.

However, the larger the step size, the more the control penalty occurs. That is, the larger the step size, the more the signal-to-noise ratio (SNR) of the main signal passing through the adaptive filter deteriorates. In a case where the fluctuation speed of the polarization state is constant, the vector of the tap coefficient updated by the step size corresponding to the constant fluctuation speed is set in the adaptive filter, thereby obtaining the optimum tracking performance.

On the other hand, in a case where the fluctuation speed of the polarization state is not constant, the tap coefficient updated with a large step size in accordance with the maximum value of the fluctuation speed of the polarization state is set in the adaptive filter. In this case, the vector of the tap coefficient updated with an unnecessarily large step size is set in the adaptive filter regardless of whether the fluctuation speed of the polarization state is slow. Thus, the signal-to-noise ratio of the main signal deteriorates.

In the optical ground wire, the time zone in which the fluctuation speed of the polarization state is very fast is a very limited time zone such as the moment of lightning. In most time zones, the fluctuation speed of the polarization state is slow. Since the tap coefficients updated by an unnecessarily large step size are always set in the adaptive filter, the signal-to-noise ratio of the main signal deteriorates in most time zones. In such a case, the power consumption for error correction processing increases. In addition, margins for other deterioration factors in coherent optical data transmission are wasted. Thus, in the case where the tracking performance of the high-speed fluctuation of the polarization state is improved, the signal-to-noise ratio at the time of the low-speed fluctuation of the polarization state cannot be improved.

In view of the above-mentioned circumstances, an object of the present invention is to provide an adaptive equalizer, a step size derivation method, and a program that can improve the tracking performance of a polarization state to a high-speed fluctuation and can improve a signal-to-noise ratio at the time of a low-speed fluctuation of the polarization state.

Solution to Problem

An aspect of the present invention is an adaptive equalizer including an updating unit that updates a step size of a vector of a tap coefficient used for controlling an adaptive filter based on a time-series update vector in accordance with a time-series input and output of the adaptive filter that tracks a polarization state of an optical signal received by a coherent optical receiver.

An aspect of the present invention is a step size derivation method executed by an adaptive equalizer, the step size derivation method including an updating step of updating a step size of a vector of a tap coefficient used for controlling an adaptive filter based on a time-series update vector in accordance with a time-series input and output of the adaptive filter that tracks a polarization state of an optical signal received by a coherent optical receiver.

An aspect of the present invention is a program for causing a computer to function as the above-described adaptive equalizer.

Advantageous Effects of Invention

According to the present invention, it is possible to improve the tracking performance of the polarization state to a high-speed fluctuation, and to improve the signal-to-noise ratio at the time of a low-speed fluctuation of the polarization state.

DESCRIPTION OF EMBODIMENTS

An embodiment of the present invention will be described in detail with reference to the drawings.

First Embodiment

Figure 1:
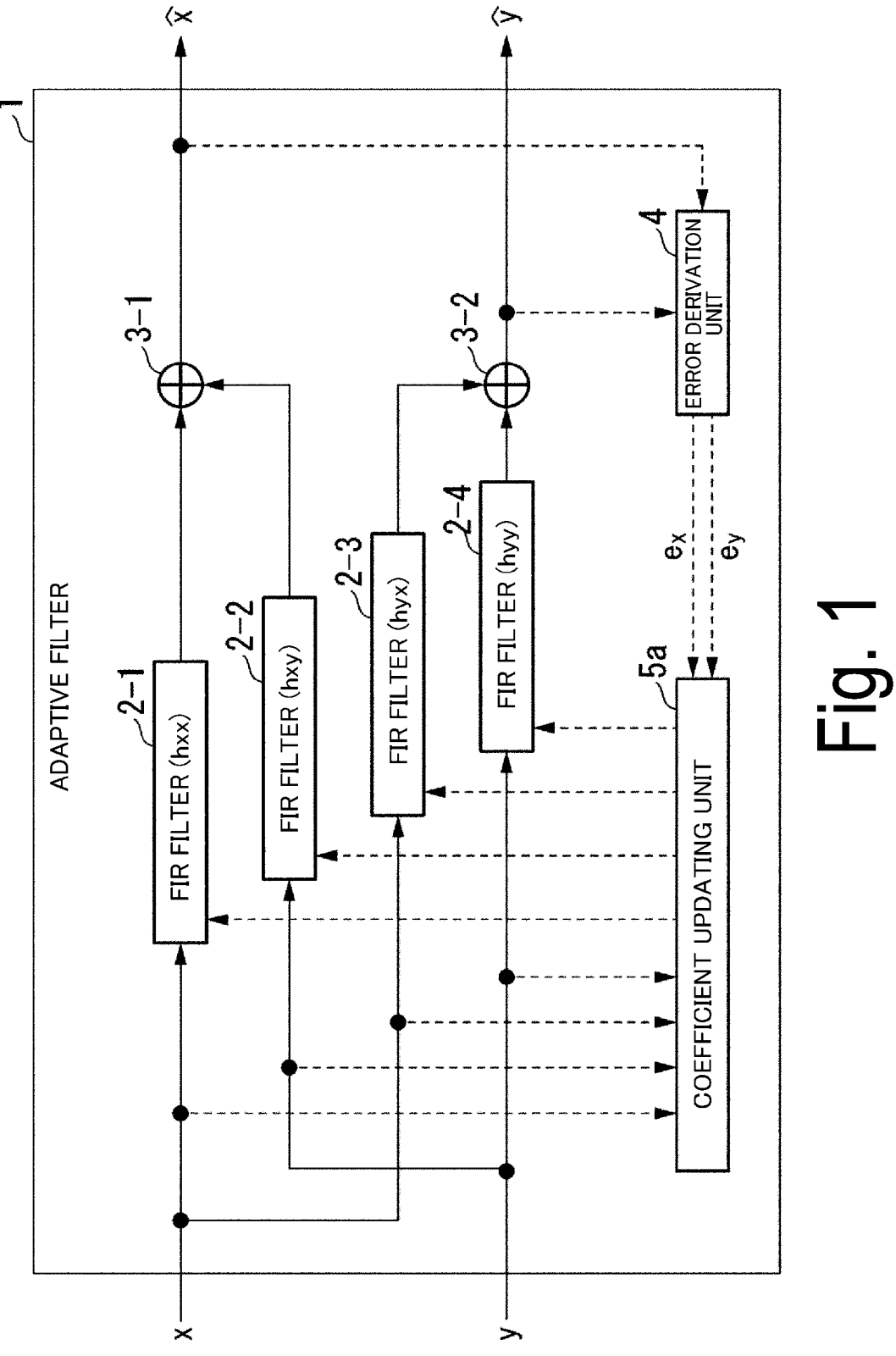
FIG. 1 is a diagram illustrating a configuration example of an adaptive filter in a first embodiment.

FIG. 1 is a diagram illustrating a configuration example of an adaptive filter 1. The adaptive filter 1 is provided in a coherent optical receiver of an optical communication system. The adaptive filter 1 is provided with an FIR filter 2-1, an FIR filter 2-2, an FIR filter 2-3, and an FIR filter 2-4 as a butterfly configuration of two-system input and two-system output. In addition, the adaptive filter 1 is provided with two addition units 3, an error derivation unit 4, and a coefficient updating unit 5a.

In the following, the symbol "A" that would appear above a character in the drawings is written immediately before the character. For example, the symbol "A" that would appear above a character in the drawing is written immediately before the character "x" as in "Ax."

"x" illustrated in FIG. 1 represents an amplitude vector of an x-polarization component (horizontal polarization component) of the main signal (digital signal) input to a FIR filter 2. "y" represents an amplitude vector of a y-polarization component (vertical polarization component) of the main signal (digital signal) input to the FIR filter 2. "^x" represents the amplitude vector of the x-polarization component (horizontal polarization component) of the main signal (digital signal) output from the addition unit 3. "^y" represents the amplitude vector of the y-polarization component (vertical polarization component) of the main signal (digital signal) output from the addition unit 3.

The FIR filter 2-1 uses a tap coefficient "$h_{xx}$" set by the coefficient updating unit 5a to execute filter processing of a finite impulse response to the amplitude vector of the x-polarization component of the main signal. The FIR filter 2-1 outputs the result of such filter processing to the addition unit 3-1.

The FIR filter 2-2 uses a tap coefficient "$h_{xy}$" set by the coefficient updating unit 5a to execute filter processing of the finite impulse response to the amplitude vector of the y-polarization component of the main signal. The FIR filter 2-2 outputs the result of such filter processing to the addition unit 3-1.

An FIR filter 2-3 uses a tap coefficient "$h_{yx}$" set by the coefficient updating unit 5a to execute filter processing of the finite impulse response to the amplitude vector of the x-polarization component of the main signal. The FIR filter 2-3 outputs the result of such filter processing to the addition unit 3-2.

The FIR filter 2-4 uses a tap coefficient "$h_{yy}$" set by the coefficient updating unit 5a to execute filter processing of the finite impulse response to the amplitude vector of the y-polarization component of the main signal. The FIR filter 2-2 outputs the result of such filter processing to the addition unit 3-2.

The addition unit 3-1 adds the result of the filter processing by the FIR filter 2-1 and the result of the filter processing by the FIR filter 2-2 to output the amplitude vector of the x-polarization component of the main signal (digital signal) from which crosstalk is removed. The addition unit 3-2 adds the result of the filter processing by the FIR filter 2-3 and the result of the filter processing by the FIR filter 2-4 to output the amplitude vector of the y-polarization component of the main signal (digital signal) from which crosstalk is removed.

The coefficient updating unit 5a adaptively controls a vector "h" of tap coefficients used for the four FIR filters 2, thereby eliminating crosstalk between the amplitude vector "x" of the x-polarization component input to the FIR filter 2 and the amplitude vector "y" of the y-polarization component input to the FIR filter 2.

The error derivation unit 4 outputs the addition result of the amplitude vector of the x-polarization component output from the FIR filter 2-1 and the amplitude vector of the y-polarization component output from the FIR filter 2-2, for example, the difference with a pilot signal (known signal) to the coefficient updating unit 5a as error information '$e_x$' of the amplitude vector of the x-polarization component.

The error derivation unit 4 outputs the addition result of the amplitude vector of the y-polarization component output from the FIR filter 2-4 and the amplitude vector of the x-polarization component output from the FIR filter 2-3, for example, the difference with a pilot signal (known signal) to the coefficient updating unit 5a as error information of the amplitude vector of the y-polarization component.

The coefficient updating unit 5a updates the vector "h" of tap coefficients used in the four FIR filters 2 based on the amplitude vector "x" of the x-polarization component of the main signal input to the FIR filter 2-1 or FIR filter 2-3, the amplitude vector "y" of the y-polarization component of the main signal input to the FIR filter 2-2 or FIR filter 2-4, the error information "$e_x$" of the amplitude vector of the x-polarization component, and the error information of the amplitude vector of the y-polarization component.

The coefficient updating unit 5a may optimize the vector "h" of the updated tap coefficient by executing an optimization algorithm such as a steepest descent method. The steepest descent method executed by the coefficient updating unit 5a may be any one of, for example, a pilot-aided LMS algorithm, a decision-directed LMS algorithm, a constant envelope criterion algorithm, and a multi-modulus-algorithm.

In a case where the pilot-aided LMS algorithm is executed, the error derivation unit 4 derives information on each error by using the pilot signal (known signal). In a case where the decision-directed LMS algorithm is executed, the error derivation unit 4 derives information on each error using temporary determination.

In a case where the constant envelope criterion algorithm is executed, the coefficient updating unit 5a updates the vector "h" of the tap coefficient so that the amplitude of the main signal becomes constant without using phase information of the main signal. In a case where the multi-modulus-algorithm is executed, the coefficient updating unit 5a updates the vector "h" of the tap coefficient so that the amplitude of the real part of the amplitude vector and the amplitude of the imaginary part of the amplitude vector are each fixed.

Next, a configuration example of the coefficient updating unit 5a will be described.

Figure 2:
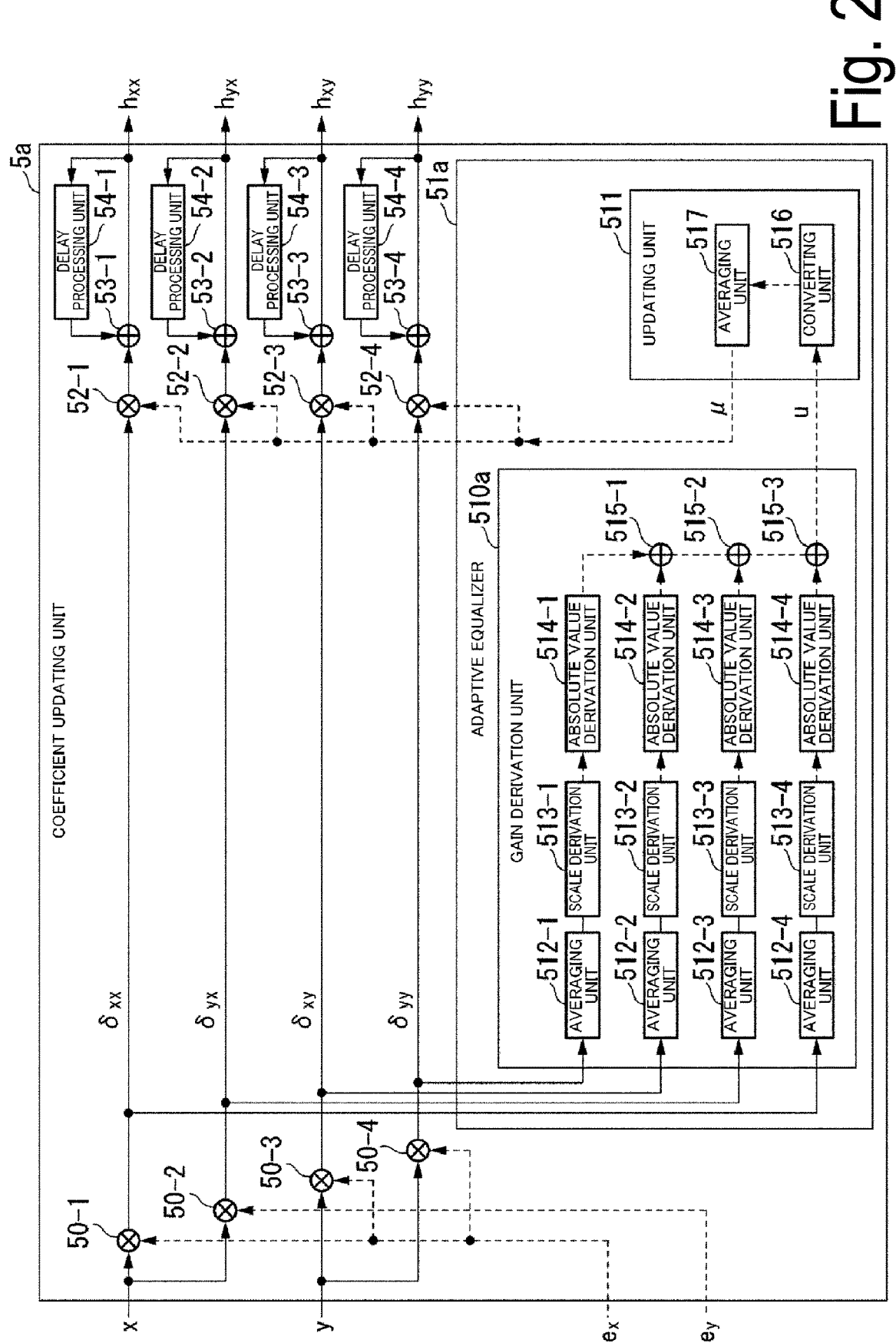
FIG. 2 is a diagram illustrating a configuration example of a coefficient updating unit in the first embodiment.

FIG. 2 is a diagram illustrating a configuration example of the coefficient updating unit 5a. The coefficient updating unit 5a is provided with four first multiplication units 50, an adaptive equalizer 51a, and four second multiplication units 52. The coefficient updating unit 5a includes four addition units 53 and four delay processing units 54 as a feedback circuit having four output systems ($h_{xx}$, $h_{yx}$, $h_{xy}$, and $h_{yy}$).

The adaptive equalizer 51a is provided with a gain derivation unit 510a and an updating unit 511. The gain derivation unit 510a includes four averaging units 512, four scale derivation units 513, four absolute value derivation units 514, and three addition units 515. The averaging unit 512 is an FIR filter or an infinite impulse response (IIR) filter. The updating unit 511 includes a conversion unit 516 and an averaging unit 517. The averaging unit 517 is an FIR filter or an IIR filter.

The output terminals of the averaging units 512-$n$ ($n$ is an integer from 1 to 4) are connected to the input terminals of the scale derivation units 513-$n$. The output terminals of the scale derivation units 513-$n$ are connected to the input terminals of the absolute value derivation units 514-$n$.

In the following description, for items common to the averaging unit 512-1, the averaging unit 512-2, the averaging unit 512-3, and the averaging unit 512-4, a part of the reference numeral is omitted, and is referred to as "averaging unit 512".

In the following description, for items common to the scale derivation unit 513-1, the scale derivation unit 513-2, the scale derivation unit 513-3, and the scale derivation unit 513-4, a part of the reference numeral is omitted, and it is referred to as a "scale derivation unit 513".

In the following description, for items common to the absolute value derivation unit 514-1, the absolute value derivation unit 514-2, the absolute value derivation unit 514-3, and the absolute value derivation unit 514-4, a part of the reference numeral is omitted, and it is referred to as an "absolute value derivation unit 514".

In the following description, for items common to the addition unit 515-1, the addition unit 515-2, and the addition unit 515-3, a part of the reference numeral is omitted, and it is referred to as an "addition unit 515".

The first multiplication unit 50-1 multiplies the amplitude vector "x" of the x-polarization component by error information "$e_x$" of the amplitude vector of the x-polarization component, thereby deriving an update vector "$\delta_{xx}$" as shown by Equation (2). The first multiplication unit 50-2 similarly derives an update vector "$\delta_{yx}$". The first multiplication unit 50-3 similarly derives an update vector "$\delta_{xy}$". The first multiplication unit 50-4 similarly derives an update vector "$\delta_{yy}$".

[Math. 2]

$$\begin{cases} \delta_{xx} = e_x(n)x(n) \\ \delta_{xy} = e_x(n)y(n) \\ \delta_{yx} = e_y(n)x(n) \\ \delta_{yy} = e_y(n)y(n) \end{cases} \tag{2}$$

Here, the update vector is the result of dividing the second term of the right side of Equation (1) by the step size "$\mu$". The step size "$\mu$" is derived based on the scale of the size of each update vector (the DC gain of each update vector).

Since in a case where the polarization state is fluctuated rapidly, the tap coefficients (compensation coefficients) need to be updated in a short time, the scale of the magnitude of the update vector "$\delta$" should be a large value. Then, a coefficient updating unit 5a increases the step size "$\mu$" according to the scale of the size of the update vector "$\delta$".

The gain derivation unit 510a (gain derivator) derives a DC gain "u" of the update vector "$\delta$" as a measure of the magnitude of the update vector "$\delta$".

The vector "h" of the tap coefficient is recursively updated as shown by Equation (1). Before every update, the first multiplication unit 50 derives an update vector "$\delta = \delta_{xx}$, $\delta_{xy}$, $\delta_{yx}$, $\delta_{yy}$)". The derived update vector "$\delta$" greatly varies due to noise or the like. The coefficient updating unit 5a monitors the tendency of long-term fluctuation in the update vector "$\delta$" in order to control the step size "$\mu$".

Therefore, the four averaging units 512 perform averaging processing on each update vector component. For example, the four averaging units 512 remove short-term fluctuations in each update vector component by passing each update vector component through a low pass filter "$h_{LPF}$" as shown in Equation (3). The updated vector "$\langle\delta\rangle$" averaged for some long period of time is expressed as represented by Equation (3).

[Math. 3]

$$\langle\delta(t)\rangle = \sum_{\tau=-\infty}^{t} h_{LPF}(t-\tau) * \delta(t) \tag{3}$$

Here, the "$h_{LPF}$" is a tap coefficient of the low-pass filter (LPF) of the averaging unit 512. "t" represents time. Since the same processing is applied to each update vector, the subscript is omitted in the notation of Equation (3).

The averaged update vector $\langle\delta\rangle = (\delta_1, \delta_2, \ldots, \delta_K)$ is a complex vector. On the other hand, the step size "$\mu$" is a non-negative real number. Therefore, it is necessary for the gain derivation unit 510a to extract a non-negative real number representing the size of the update vector from the update vector "$\langle\delta\rangle$".

Four scale derivation units 513 derive a total sum for each component of the averaged update vector. Four absolute value derivation units 514 derive an absolute value of a total sum for each update vector component for each update vector component. The three addition units 515 add the absolute value of the sum for each component for all the components (xx component, xy component, yx component, yy component) of the update vector.

That is, the four scale derivation units 513, the four absolute value derivation units 514, and the three addition units 515 derive a parameter "u" representing a measure of the magnitude of the update vector, as shown in Equation (4).

[Math. 4]

$$u(t) = \left| \sum_{k=1}^{K} \delta_{xx}^{k} \right| + \left| \sum_{k=1}^{K} \delta_{xy}^{k} \right| + \left| \sum_{k=1}^{K} \delta_{yx}^{k} \right| + \left| \sum_{k=1}^{K} \delta_{yy}^{k} \right| \quad (4)$$

As described above, the parameter "u" represents the DC gain of the update vector as a measure of the magnitude of the update vector.

The scale derivation unit 513 may derive Euclidean norm or L2 norm (power) for each update vector component instead of deriving the total sum for each update vector component.

The conversion unit 516 converts the parameter "u" into the step size "μ" before being averaged by the averaging unit 517. Here, the conversion unit 516 derives the value of the polynomial exemplified on the right side of Equation (5) using the parameter "u". The averaging unit 517 derives the step size "μ" by an averaging process "< >" for the polynomial exemplified on the right side of Equation (5).

$$\mu(t) = \langle \mu_0 + \alpha u + \beta u^2 + \gamma u^3 + \ldots \rangle \quad [\text{Math. 5}]$$

Here, "$\mu_0$" is the minimum step size in the case where polarization state is stationary (in the case where the value of the parameter "u" is substantially zero). Each coefficient such as "α", "β" and "γ" is heuristically optimized. That is, each coefficient such as "α", "β", and "γ" is derived in a trial-and-error manner.

For example, the relationship between the optimum step size "μ" and the parameter "u" is approximated by a polynomial, whereby the polynomial exemplified on the right side of Equation (5) is determined.

For example, the polynomial exemplified on the right side of Equation (5) may be determined based on the results of simulation or experiment based on the relationship between the optimum step size "μ" or the parameter "u" and the fluctuation speed of the polarization state.

Instead of using the polynomial, the conversion unit 516 may convert the parameter "u" into the step size "μ" by using a lookup table in which the relationship between the step size "μ" and the parameter "u" is registered.

The conversion unit 516 may optimize the step size "μ" by executing an optimization algorithm such as the steepest descent method. The steepest descent method executed by the conversion unit 516 may be any one of, for example, a Pilot-aided LMS algorithm, a Decision-Directed LMS algorithm, a constant envelope criterion algorithm, and a Multi-Modulus-Algorithm.

The second multiplication unit 52-1 multiplies the step size "μ" by the update vector "$\delta_{xx} = e_x(n)x(n)$" as shown in the second term on the right side of Equation (1). The second multiplication unit 52-2 multiplies the step size "μ" by the update vector "$\delta_{xy} = e_x(n)y(n)$" in the same manner. The second multiplication unit 52-3 multiplies the step size "μ" by the update vector "$\delta_{xy} = e_y(n)x(n)$" in the same manner. The second multiplication unit 52-4 multiplies the step size "μ" by the update vector "$\delta_{yy} = = e_y(n)y(n)$" in the same manner.

The feedback circuit including four addition units 53 and four delay processing units 54 recursively updates the vector "h" of the tap coefficient by using the multiplication result by the four second multiplication units 52 as shown by Equation (1). The feedback circuit sets the vector "h" of the tap coefficient to four FIR filters 2.

Next, an operation example of the coefficient updating unit 5a will be described.

Figure 3:
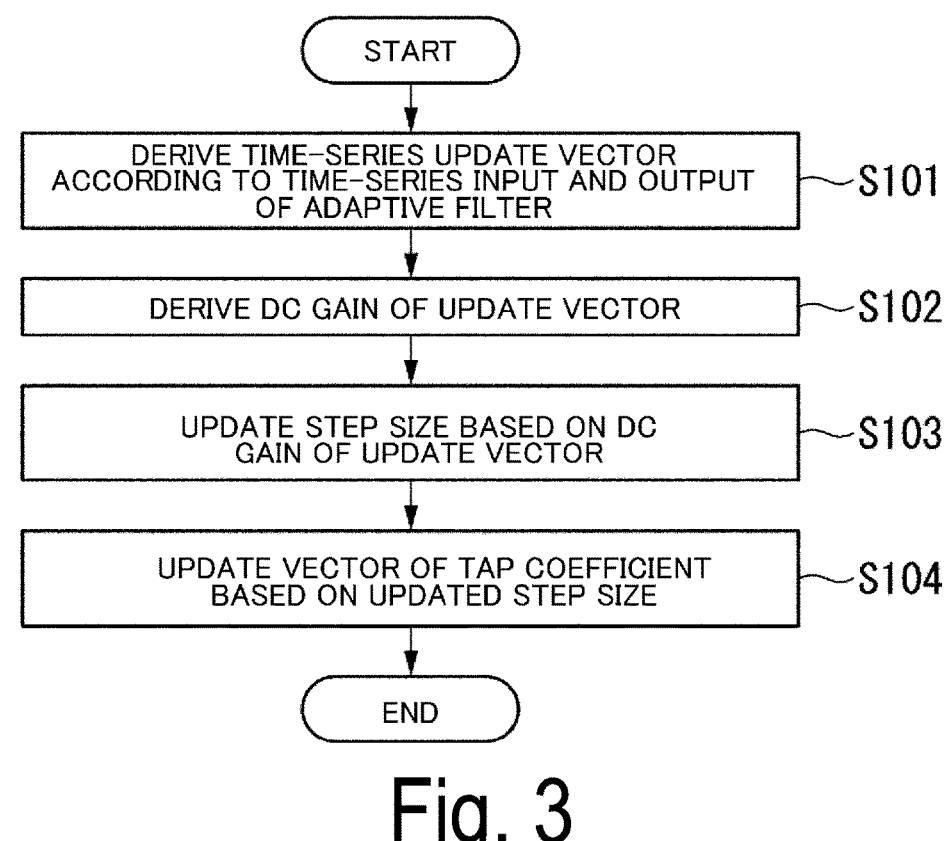
FIG. 3 is a flowchart illustrating an operation example of the coefficient updating unit in the first embodiment.

FIG. 3 is a flowchart illustrating an operation example of the coefficient updating unit 5a. The four first multiplication unit 50 derives a time-series update vector "δ" according to the time-series input (x, y) and time-series output ($e_x$, $e_y$) of the adaptive filter 1 (step S101). The gain derivation unit 510a derives the DC gain "u" of the update vector based on the time-series update vector "δ" (step S102). The updating unit 511 updates the step size "μ" based on the DC gain of the update vector (step S103). The updating unit 511 updates the vector "h" of the tap coefficient based on the updated step size (step S104).

As described above, the adaptive equalizer 51a controls the adaptive filter 1. The adaptive filter 1 tracks the polarization state of the optical signal received by the coherent optical receiver. The updating unit 511 (updater) updates the step size "μ" of the vector "h" of the tap coefficient used for control of the adaptive filter 1 based on the time-series update vector "δ" corresponding to the time-series input [x, y] and the time-series output [ˆx, ˆy] of the adaptive filter 1. Here, the updating unit 511 updates the step size "μ" based on the DC gain of the update vector (a measure of the magnitude of the update vector).

Thus, it is possible to improve the tracking performance of the polarization state to the high-speed fluctuation, and to improve the signal-to-noise ratio at the time of the low-speed fluctuation of the polarization state.

Figure 4:
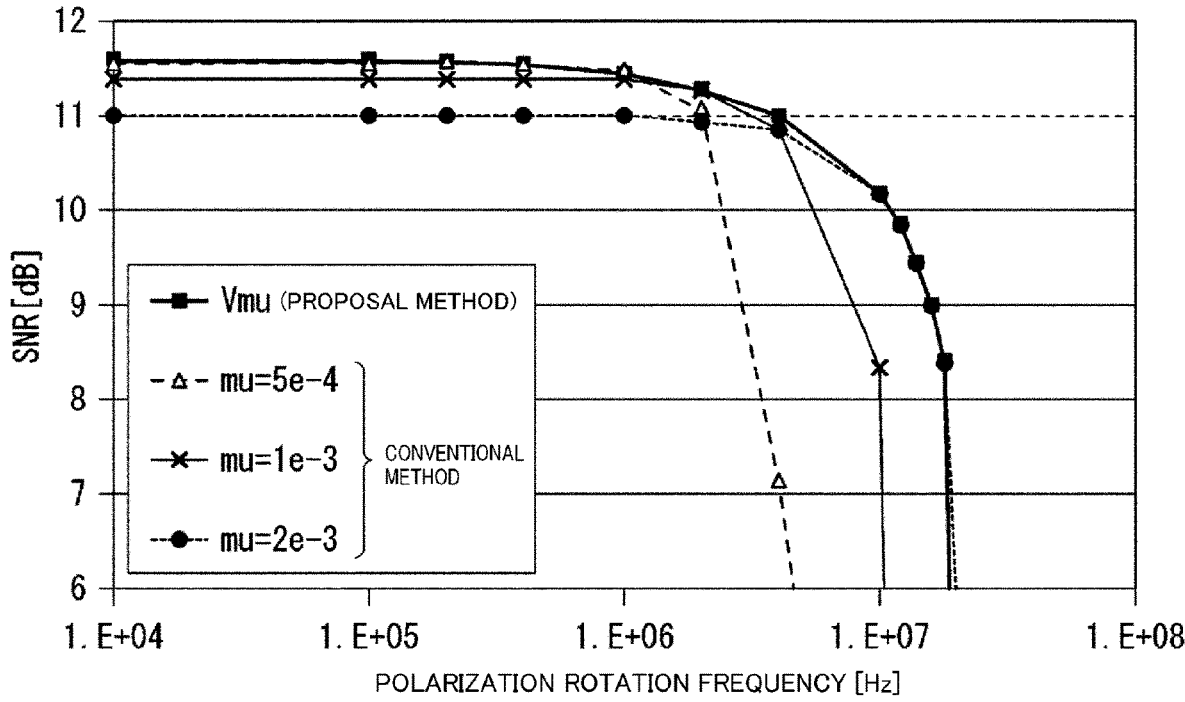
FIG. 4 is a diagram illustrating an example of improvement in followability to changes in polarization state in the first embodiment.

FIG. 4 is a diagram illustrating an example of improvement (simulation evaluation example) in followability to changes in polarization state. The horizontal axis represents the polarization rotation frequency [Hz]. The vertical axis represents the signal-to-noise ratio (SNR) [dB]. In the "conventional method" illustrated in FIG. 4, each step size "mu" is fixed. The larger the fixed step size "mu", the better the followability fluctuating in the polarization state. However, in a case where the fluctuation speed of the polarization state is low, the signal-to-noise ratio is rapidly lowered.

On the other hand, in the "proposal method" illustrated in FIG. 4, a step size "Vmu" is variable. The graph of the "proposal method" illustrated in FIG. 4 is a graph illustrating the followability of the adaptive filter 1 of the first embodiment. As shown in this graph, the adaptive filter 1 can improve the followability of the polarization state to the high-speed fluctuation, and can improve the signal-to-noise ratio at the time of the low-speed fluctuation of the polarization state.

Second Embodiment

In the second embodiment, the difference from the first embodiment is that the four step sizes ($\mu_{xx}$, $\mu_{yx}$, $\mu_{yy}$) are updated based on the DC gains of the four update vectors. In the second embodiment, differences from the first embodiment will be mainly described.

Figure 5:
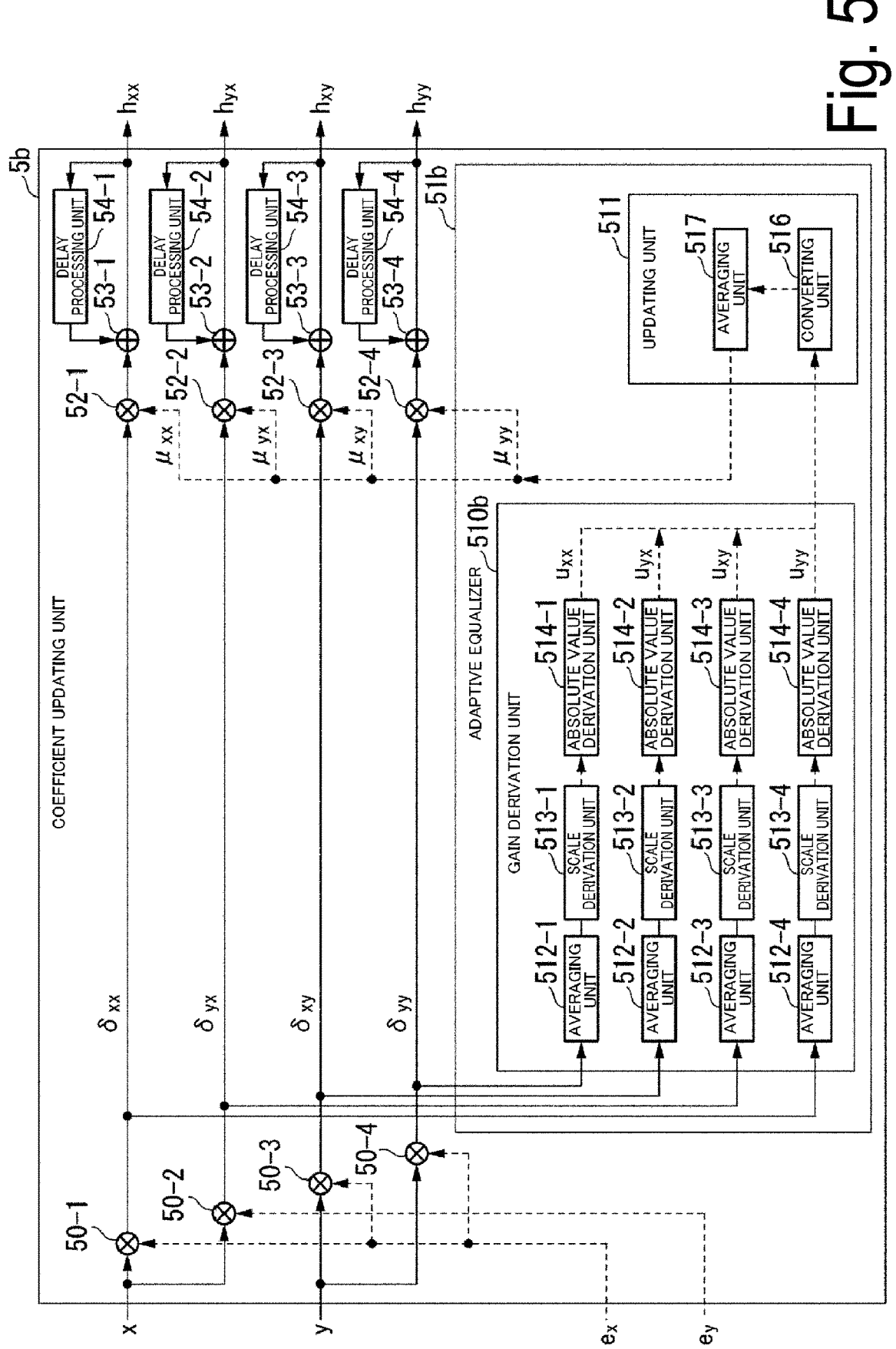
FIG. 5 is a diagram illustrating a configuration example of a coefficient updating unit in a second embodiment.

FIG. 5 is a diagram illustrating a configuration example of a coefficient updating unit 5b. Four first multiplication units 50, an adaptive equalizer 51b, and four second multiplication units 52 are provided. The coefficient updating unit 5b includes four adding units 53 and four delay processing units 54 as a feedback circuit having four output systems ($h_{xx}$, $h_{yx}$, $h_{xy}$, and $h_{yy}$).

The adaptive equalizer 51a is provided with a gain derivation unit 510a and an updating unit 511. The gain derivation unit 510a includes four averaging units 512, four scale derivation units 513, and four absolute value derivation units 514. The updating unit 511 includes the conversion unit 516 and the averaging unit 517.

Four scale derivation units 513 and four absolute value derivation units 514 derive a parameter "u" representing the scale of the size of the update vector, for each update vector component, as shown by Equation (6).

[Math 6]

$$u_{xx}(t) = \left| \sum_{k=1}^{K} \delta_{xx}^{k} \right| \tag{6}$$

$$u_{xy}(t) = \left| \sum_{k=1}^{K} \delta_{xy}^{k} \right|$$

$$u_{xx}(t) = \left| \sum_{k=1}^{K} \delta_{xx}^{k} \right|$$

$$u_{xx}(t) = \left| \sum_{k=1}^{K} \delta_{xx}^{k} \right|$$

In this way, in Equation (6), suffixes "xx", "xy", "yx" and "yy" representing the component of the update vector are attached to the parameter "u". The vector "h" of the tap coefficient is recursively updated for each update vector component as shown by Equation (7).

[Math. 7]

$$\begin{cases} h_{xx}(n+1) = h_{xx}(n) + \mu_{xx} * e_x(n)x(n) \\ h_{xy}(n+1) = h_{xx}(n) + \mu_{xy} * e_x(n)y(n) \\ h_{yx}(n+1) = h_{yx}(n) + \mu_{yx} * e_y(n)x(n) \\ h_{yy}(n+1) = h_{yy}(n) + \mu_{yy} * e_y(n)y(n) \end{cases} \tag{7}$$

In this manner, in Equation (7), suffixes "xx", "xy", "yx" and "yy" representing the component of the update vector are attached to the step size "μ".

As described above, the updating unit 511 updates the step size "$\mu=(\mu_{xx}, \mu_{yx}, \mu_{xy}, \mu_{yy})$" for each component of the tap coefficients used to control the adaptive filter 1 based on the time-series update vector "$\delta=(\delta_{xx}, \delta_{yx}, \delta_{xy}, \delta_{yy})$" in accordance with the time-series input (x, y) and output (^x, ^y) of the adaptive filter 1, Here, the updating unit 511 updates the step size "$\mu=(\mu_{xx}, \mu_{yx}, \mu_{xy}, \mu_{yy})$" for each component based on the DC gain of the update vector (a measure of the magnitude of the update vector).

Thus, it is possible to improve the tracking performance of the polarization state to the high-speed fluctuation, and to improve the signal-to-noise ratio at the time of the low-speed fluctuation of the polarization state.

Figure 6:
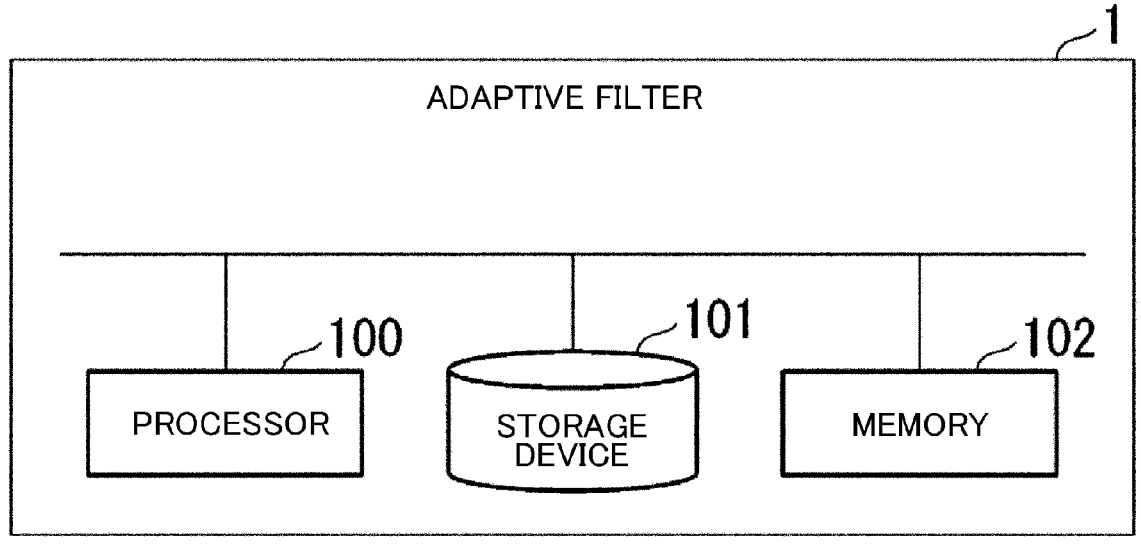
FIG. 6 is a diagram illustrating a hardware structural example of the adaptive filter in each embodiment.

FIG. 6 is a diagram illustrating a hardware structural example of the adaptive filter 1 in each embodiment. Some or all of functional units of the adaptive filter 1 is realized as software by a processor 100 such as a central processing unit (CPU) executing a program stored in a memory 102 having a nonvolatile recording medium (non-transitory recording medium). A program may be recorded in a computer-readable recording medium. Examples of the computer-readable recording medium include a portable medium such as a flexible disc, a magneto-optical disc, a Read Only Memory (ROM), or a Compact Disc Read Only Memory (CD-ROM), and a non-transitory recording medium such as a storage device 101 including a hard disk incorporated in a computer system. A part or all of each functional part of the adaptive filter 1 may be realized by using, for example, hardware including electronic circuits (electronic circuits or circuitry) using large scale integrated (LSI) circuits, application specific integrated circuits (ASICs), programmable logic devices (PLDs), field programmable gate arrays (FP-GAs), or the like.

Although the embodiments of the present invention have been described in detail with reference to the drawings, specific configurations are not limited to these embodiments, and designs and the like within a range that does not deviating from the gist of the present invention are also included.

INDUSTRIAL APPLICABILITY

The present invention is applicable to optical communication systems and coherent optical receivers.

REFERENCE SIGNS LIST

1 Adaptive filter
2 FIR filter
3 Addition unit
4 Error derivation unit
5b Coefficient updating unit
50 First multiplication unit
51a, 51b Adaptive equalizer
52 Second calculation unit
53 Addition unit
54 Delay processing unit
100 Processor
101 Storage device
102 Memory
510a, 510b . . . Gain derivation unit
511 Updating unit
512 Averaging unit
513 Scale derivation unit
514 Absolute value derivation unit
515 Addition unit
516 Conversion unit
517 Averaging unit

The invention claimed is:

1. An adaptive equalizer comprising:
a processor; and
a storage medium having computer program instructions stored thereon, wherein the computer program instructions, when executed by the processor, perform processing of:
updating a step size of a vector of a tap coefficient used for controlling an adaptive filter based on a time-series update vector in accordance with a time-series input and output of the adaptive filter that tracks a polarization state of an optical signal received by a coherent optical receiver,
wherein the computer program instructions further perform processing of updating the step size based on a DC gain of the update vector.

2. The adaptive equalizer according to claim 1, wherein the computer program instructions further perform processing of:

deriving a DC gain of the update vector based on any one of a sum of the update vector components, a Euclidean norm of the update vector components, and an L2 norm of the update vector components.

3. The adaptive equalizer according to claim 1, wherein the computer program instructions further perform processing of updating the step size for each update vector component based on a DC gain for each update vector component.

4. A step size derivation method executed by an adaptive equalizer, the method comprising the step of:

updating a step size of a vector of a tap coefficient used for controlling an adaptive filter based on a time-series update vector in accordance with a time-series input and output of the adaptive filter that tracks a polarization state of an optical signal received by a coherent optical receiver, wherein the step of updating includes updating the step size based on a DC gain of the update vector.

5. A non-transitory computer readable medium which stores a program for causing a computer to function as the adaptive equalizer according to claim 1.

\* \* \* \* \*